US012737878B2

(12) United States Patent
Frazer et al.

(10) Patent No.: US 12,737,878 B2
(45) Date of Patent: Sep. 15, 2026

(54) BONE FRACTURE RISK PREDICTION USING LOW-RESOLUTION CLINICAL COMPUTED TOMOGRAPHY (CT) SCANS

(71) Applicant: Southwest Research Institute, San Antonio, TX (US)

(72) Inventors: Lance L. Frazer, San Antonio, TX (US); Daniel P. Nicolella, San Antonio, TX (US); Nathan Louis, Buford, GA (US)

(73) Assignee: Southwest Research Institute, San Antonio, TX (US)

( * ) Notice: Subject to any disclaimer, the term of this patent is extended or adjusted under 35 U.S.C. 154(b) by 410 days.

(21) Appl. No.: 17/935,153

(22) Filed: Sep. 26, 2022

(65) Prior Publication Data

US 2023/0105966 A1 Apr. 6, 2023

Related U.S. Application Data

(60) Provisional application No. 63/261,690, filed on Sep. 27, 2021.

(51) Int. Cl.
*G06T 7/00* (2017.01)

(52) U.S. Cl.
CPC .. *G06T 7/0012* (2013.01); *G06T 2207/10081* (2013.01); *G06T 2207/20081* (2013.01); *G06T 2207/20084* (2013.01); *G06T 2207/30008* (2013.01)

(58) Field of Classification Search
CPC ......... G06T 7/0012; G06T 2207/10081; G06T 2207/20081; G06T 2207/20084; G06T 2207/30008
See application file for complete search history.

(56) References Cited

U.S. PATENT DOCUMENTS

| | | | | |
|---|---|---|---|---|
| 5,172,695 | A | 12/1992 | Cann et al. | |
| 6,625,303 | B1 | 9/2003 | Young et al. | |
| 7,509,596 | B2 | 3/2009 | Koo et al. | |
| 8,725,231 | B2 | 5/2014 | Nicolella et al. | |
| 2005/0148860 | A1 | 7/2005 | Liew et al. | |
| 2006/0062442 | A1 | 3/2006 | Arnaud et al. | |
| 2009/0227503 | A1 * | 9/2009 | Awad | A61P 19/00 514/5.5 |
| 2011/0040168 | A1 | 2/2011 | Arnaud et al. | |
| 2014/0093149 | A1 * | 4/2014 | Arnaud | A61B 6/52 382/128 |
| 2019/0336097 | A1 | 11/2019 | Bregman-Amitai et al. | |
| 2020/0111194 | A1 * | 4/2020 | Wang | G06N 3/047 |

(Continued)

OTHER PUBLICATIONS

R. Müller, P. Rüegsegger, (1995) Three-dimensional finite element modelling of non-invasively assessed trabecular bone structures, Medical Engineering & Physics, vol. 17, Issue 2, 1995, pp. 126-133, ISSN 1350-4533, https://doi.org/10.1016/1350-4533(95)91884-J. (Year: 1995).*

(Continued)

*Primary Examiner* — Molly Wilburn
*Assistant Examiner* — Jacqueline R Zak
(74) *Attorney, Agent, or Firm* — Secant IP, PLLC

(57) ABSTRACT

A bone fracture risk analysis, and more particularly, to bone fracture risk prediction using low-resolution clinical CT scans, for example, CT scans having a resolution in a range of 250 to 1000 microns.

12 Claims, 4 Drawing Sheets

(56) References Cited

U.S. PATENT DOCUMENTS

2020/0402226 A1* 12/2020 Peng .................... G06T 7/0012
2024/0202885 A1* 6/2024 Yang .................... G06T 11/008

OTHER PUBLICATIONS

Guha I, Nadeem SA, You C, Zhang X, Levy SM, Wang G, Torner JC, Saha PK. Deep Learning Based High-Resolution Reconstruction of Trabecular Bone Microstructures from Low-Resolution CT Scans using GAN-CIRCLE. Proc SPIE Int Soc Opt Eng. Feb. 2020. (Year: 2020).*
Benameur et al. (2005) "A Hierarchical Statistical Modeling Approach for the Unsupervised 3-D Biplanar Reconstruction of the Scoliotic Spine", IEEE Transactions on Biomedical Engineering, vol. 52, No. 12, pp. 2041-2057.
Bessho et al. (2004) "Prediction of the strength and fracture location of the femoral neck by CT-based finite-element method: a preliminary study on patients with hip fracture", Journal of Orthopaedic Science, vol. 9, Japan, pp. 545-550.
Brechbuhler, et al. (1996) "Parametrization of closed surfaces for 3-D shape description", Communication Technology Laboratory Image Science, Swiss Federal Institute of Technology, Zurich, pp. 1-20.
Center et al. (1998), "Femoral Neck Axis Length, Height Loss and Risk of Hip Fracture in Males and Females", Osteoporosis International, vol. 8, Australia, pp. 75-81.
Cody et al. (1999), "Femoral strength is better predicted by finite element models than QCT and DXA", Journal of Biomechanics, vol. 32, U.S., pp. 1013-1020.
Cootes et al. (1994), "The Use of Active Shape Models for Locating Structure in Medical Images", Image and Vision Computing, vol. 12, No. 6, England, pp. 355-365.
Cootes et al. (1995), "Active Shape Models—Their Training and Application", Computer Vision and Image Understanding, vol. 61, No. 1, England, pp. 38-59.
Crabtree, et al.(2002), "Improving Risk Assessment: Hip Geometry, Bone Mineral Distribution and Bone Strength in Hip Fracture Cases and Controls. The EPOS Study", Osteoporosis International, vol. 13, United Kingdom, pp. 48-54.
Davies et al. (2002) 3D Statistical Shape Models Using Direct Optimisation of Description Length. ECCV, LNCS 2352, pp. 3-20, United Kingdom.
Davies et al. (2002), "A Minimum Description Length Approach to Statistical Shape Modelling", University of Manchester/ AstraZeneca, United Kingdom, pp. 1-14.
Dornaika et al., (2006), "Fitting 3D face models for tracking and active appearance model training", Image and Vision Computing, vol. 24, Spain/Sweden, pp. 1010-1024.
El-Kaissi et al., (2005), "Femoral neck geometry and hip fracture risk: the Geelong osteoporosis study", Osteoporosis International, vol. 16, Australia, pp. 1299-1303.
Ferrarini et al., (2006), "Shape differences of the brain ventricles in Alzheimer's disease", NeuroImage, vol. 32, The Netherlands, pp. 1060-1069.
Frost et al., (2002), "A Comparison of Fracture Discrimination Using Calcaneal Quantitative Ultrasound and Dual X-ray Absorptiometry in Women with a History of Fracture at Sites Other Than the Spine and Hip", Calcified Tissue International, vol. 71, United Kingdom, pp. 207-211.
Genant et al., (1996), "Advances in the Noninvasive Assessment of Bone Density, Quality, and Structure", Calcified Tissue International, vol. 59 (Suppl 1), U.S., pp. SI0-S15.
Gnudi et al., (1998), "Simultaneous densitometry and quantitative bone sonography in the estimation of osteoporotic fracture risk", The British Journal of Radiology, vol. 71, Italy, pp. 625-629.
Gnudi et al., (1999), "Geometry of proximal femur in the prediction of hip fracture in osteoporotic women", The British Journal of Radiology, vol. 72, Italy, pp. 729-733.
Gonnelli et al., (2005), "Quantitative ultrasound and dual-energy X-ray absorptiometry in the prediction of fragility fracture in men", Osteoporos. Int., vol. 16, Italy, pp. 963-968.
Gullberg et al., (1997), "World-wide Projections for Hip Fracture", Osteoporosis International, vol. 7, United Kingdom, pp. 407-413.
Jiang et al., (2000), "Normalized BMD as a Predictor of Bone Strength", Academic Radiology, vol. 7, U.S., pp. 33-39.
Johnell et al., (2004), "Mortality after osteoporotic fractures", Osteoporosis International, vol. 15, Sweden, pp. 38-42.
Kanis, (2002), "Assessing the Risk of Vertebral Osteoporosis", Singapore Medical Journal, vol. 43(2), United Kingdom, pp. 100-105.
Kanis, (2002), "Diagnosis of osteoporosis and assessment of fracture risk", Osteoporosis III, The Lancet, vol. 359, United Kingdom, pp. 1929-1936.
Kanis et al., (2000), "Long-Term Risk of Osteoporotic Fracture in Malmo", Osteoporosis International, vol. 11, United Kingdom/The Netherlands, pp. 669-674.
Kanis et al., (2003), "The components of excess mortality after hip fracture", Bone, vol. 32, United Kingdom, pp. 468-473.
Kaus et al., (2003), "Automated 3-D PDM Construction From Segmented Images Using Deformable Models", IEEE Transactions on Medical Imaging, vol. 22, No. 8, Germany/The Netherlands, pp. 1005-1013.
Keller, (1994), Predicting the Compressive Mechanical Behavior of Bone. Journal of Biomechanics, vol. 27, No. 9, U.S, pp. 1159-1168.
Keyak, (2001), "Improved prediction of proximal femoral fracture load using nonlinear finite element models", Medical Engineering & Physics, vol. 23, U.S., pp. 165-173.
Keyak et al., (1990), "Automated three-dimensional finite element modelling of bone: a new method", Journal of Biomedical Engineering, vol. 12, U.S., pp. 389-397.
Keyak et al., (1998), "Prediction of femoral fracture load using automated finite element modeling", Journal of Biomechanics, vol. 31, U.S., pp. 125-133.
Koikkalainen et al., (2007), "Shape variability of the human striatum—Effects of age and gender", NeuroImage, vol. 34, Finland, pp. 85-93.
Lecouvet et al., (1997), "Vertebral Compression Fractures in Multiple Myeloma, Part II. Assessment of Fracture Risk with MR Imaging of Spinal Bone Marrow", Radiology, vol. 204, Belgium, pp. 201-205.
Les et al., (1994), "Estimation of Material Properties in the Equine Metacarpus with use of Quantitative Computed Tomography", Journal of Orthopaedic Research, vol. 12, U.S., pp. 822-833.
Lorenz et al., (2000), "Generation of point-based 3D statistical shape models for anatomical objects", Germany/U.S. pp. 1-32.
Lotz et al., (1991), "Fracture Prediction for the Proximal Femur Using Finite Element Models: Part I—Linear Analysis", Journal of Biomechanical Engineering, vol. 113, U.S., pp. 353-360.
Lotz et al., (1995), "Stress Distributions within the Proximal Femur during Gait and Falls: Implications for Osteoporotic Fracture", Osteoporosis International, vol. 5, U.S., pp. 252-261.
Majumdar et al., (1999), "Fractal analysis of radiographs: Assessment of trabecular bone structure and prediction of elastic modulus and strength", Medical Physics, vol. 26, No. 7, U.S., pp. 1330-1340.
Mauch, (2000), A Fast Algorithm for Computing the Closest Point and Distance Transform, Ref Type: Unpublished Work, pp. 1-17.
Melton, (2003), "Adverse Outcomes of Osteoporotic Fractures in the General Population", Journal of Bone and Mineral Research, vol. 18, No. 6, U.S., pp. 1139-1141.
Nicholson et al., (1997), "Assessment of the Strength of the Proximal Femur In Vitro: Relationship with Ultrasonic Measurements of the Calcaneus", Bone, vol. 20, No. 3, Belgium, pp. 219-224.
Oden et al., (1999), "Effect of Local Density Changes on the Failure Load of the Proximal Femur", Journal of Orthopaedic Research, vol. 17, U.S., pp. 661-667.
Patton et al., (2006), "Proximal femoral geometry and hip fractures", Acta Orthopaedic Belgica, vol. 72, United Kingdom, pp. 51-54.

(56) References Cited

OTHER PUBLICATIONS

Pepin et al., (2002), "A Probabilistic Analysis of a Nonlinear Structure Using Random Fields to Quantify Geometric Shape Uncertainties", AIAA, U.S., pp. 1-14.
Pulkkinen et al., (2006), Association of Geometric Factors and Failure Load Level with the Distribution of Cervical vs. Trochanteric Hip Fractures., Journal Bone Mineral Research, vol. 21, No. 6, Finland, pp. 895-901.
Pulkkinen et al., (2004), "Combination of bone mineral density and upper femur geometry improves the prediction of hip fracture", Osteoporosis International, vol. 15, Finland, pp. 274-280.
Maquer et al., (2015), "Bone Volume Fraction and Fabric Anisotropy are Better Determinants of Trabecular Bone Stiffness Than Other Morphological Variables", Journal of Bone and Mineral Research, vol. 30, No. 6, Switzerland/Austria, pp. 1000-1008.
Rajamani et al., (2004), "A Novel and Stable Approach to Anatomical Structure Morphing for Enhanced Intraoperative 3D Visualization", Switzerland/U.S., pp. 1-8.
Rehman et al., (2002) Quantitative computed tomography of the lumbar spine, not dual x-ray absorptiometry, is an independent predictor of prevalent vertebral fractures in postmenopausal women with osteopenia receiving long-term glucocorticoid and hormone-replacement therapy. Arthritis Rheum. 46, 1292-1297.
Ross, "Clinical Consequences of Vertebral Fractures", The American Journal of Medicine, vol. 103 (2A), pp. 30S-42S, 1997.
Rueckert, et al., (2003) "Automatic construction of 3-D statistical deformation models of the brain using nonrigid registration". IEEE Transactions on Medical Imaging vol. 22, No. 8: 1014-1025.
Shan, et al., (2006) A Knowledge-Guided Active Model Method of Cortical Structure Segmentation on Pediatric MR Images. Journal of Magnetic Resonance Imaging 24, 779-789.
Specker, et al., (2005) "High parity is associated with increased bone size and strength", Osteoporos Int 16, 1969-1974.
Stewart, et al., (2006) "Long-Term Fracture Prediction by DXA and QUS: A 10-year Prospective Study", Journal of Bone and Mineral Institute, vol. 21, No. 3: 413-418.
Sweeney, et al., (2002) "Bone Mineral Density Assessment: Comparison of Dual-Energy X-ray Absorptiometry Measurements at the Calcaneus, Spine, and Hip", Journal of Clinical Densitometry, vol. 5, No. 1: 57-62.
Tabensky, et al., (1996) "Bone Mass, Areal, and Volumetric Bone Density Are Equally Accurate, Sensitive, and Specific Surrogates of the Breaking Strength of the Vertebral Body: An In Vitro Study", Journal of Bone and Mineral Research, vol. 11, No. 12: 1981-1988.
Taddei, et al. (2006) Subject-specific finite element models of long bones: An in vitro evaluation of the overall accuracy. Journal of Biomechanics, vol. 39: 2457-2467.
Taddei, et al., (2004) "An improved method for the automatic mapping of computed tomography numbers onto finite element models", Medical Engineering & Physics, vol. 26: 61-69.
Taneichi, et al., (1997) Risk Factors and Probability of Vertebral Body Collapse in Metastases of the Thoracic and Lumbar Spine:, Spine, vol. 22, No. 3: 239-245.
Testi, et al., (2002) "Prediction of Hip Fracture Can Be Significantly Improved by a Single Biomedical Indicator", Annals of Biomedical Engineering, vol. 30: 801-807.
Viceconti, et al., (1998) "A comparative study on different methods of automatic mesh generation of human femurs", Medical Engineering & Physics, 20: 1-10.
Walker, et al., (2000) "Determining Correspondences for Statistical Models of Appearance", Computer Vision—ECCV Department of Imaging Science and Biomedical Engineering, University of Manchester, United Kingdom, Pt 1 Proceedings: 829-843.
Bayraktar, et al., (2004), "Comparison of the elastic and yield properties of human femoral trabecular and cortical bone issue", California, Journal of Biomechanics, 37: 27-35.
Keaveny et al., (2008), "Femoral Bone Strength and Its Relation to Cortical and Trabecular Changes After Treatment with PTH, Alendronate, and Their Combination as Assessed by Finite Element Analysis of Quantitative CT Scans", Journal of Bone and Mineral Research, vol. 23, No. 12, U.S., pp. 1974-1982.
Morgan, et al., (2001), "Dependence of yield strain of human trabecular bone on anatomic site", Journal of Biomechanics, vol. 34: 569-577, California.
Morgan, et al., (2003) "Trabecular bone modulus-density relationships depend on anatomic site", Journal of Biomechanics. vol. 36: 897-904, California.
Orwoll et al., (2009), "Finite Element Analysis of the Proximal Femur and Hip Fracture Risk in Older Men", Journal of Bone and Mineral Research, vol. 24, No. 3, U.S., pp. 475-483.
Pinilla et al., (1996), "Impact Direction from a Fall Influences the Failure Load of the Proximal Femur as Much as Age-Related Bone Loss", Calcified Tissue International, vol. 58, U.S., pp. 231-235.
Van den Kroonenberg, et al., 1995. "Dynamic Models for Sideways Falls from Standing height", Journal of Biomechanical Engineering. 117: Boston, 309-318.
Rao, et al., Canonical correlation analysis of sub-cortical brain structures using non-rigid registration. Springer-Verlag Berlin, Berlin. Weir 2006, LNCS 4057, pp. 66-74, 2006.
Bauer, et al. Quantitative ultrasound predicts hip and non-spine fracture in men: the MrOS study. Osteoporos Int (2007) 18:771-777.
Bessho, et al. Prediction of strength and strain of the proximal femur by a CT-based finite element method. Journal of Biomechanics 40 (2007) 1745-1753.
Burge, et al., Incidence and Economic Burden of Osteoporosis-Related Fractures in the United States, 2005-2025. Journal of Bone and Mineral Research, vol. 22, No. 3, 2007, pp. 465-475.
Styner, et al., 2003 Evaluation of 3D correspondence methods for model building. IPMI 2003, LNCS 2732, pp. 63-75, 200:3.
Stanisz, et al., "T1 T2 Relaxation and Magnetization Transfer in Tissue at 3T," Magnetic Resonance in Medicine 54:507-512 (2005).
Bredbenner, et al. "Simulation of Fall loading Using A Probabilistic Shape Based Finite Element Model Of Human Femurs," Proceedings of the ASME 2007 Summer Bioengineering Conference (SBC2007) June 20-24, Keystone Resort & Conference Center, Keystone, Colorado, USA SBC2007-176665. (3 pages).
Langton et al., (2009), "Comparison of 3D finite element analysis derived stiffness and BMD to determine the failure load of the excised proximal femur," Medical Engineering & Physics, vol. 31, Australia/United Kingdom/U.S., pp. 668-672.
Langton et al., (2009), "Generation of a 3D proximal femur shape from a single projection 2D radiographic image," Osteoporosis International, vol. 20, United Kingdom/U.S., pp. 455-461.
Shlens, "A Tutorial on Principal Component Analysis," (Dated: Apr. 22, 2009; Version 3.01) Center for Neural Science, New York University.
Bredbenner, et al. "Probabilistic Shape-Based Finite Element Modeling Of Baboon Femurs," Proceedings of BI02006 2006 Summer Bioengineering Conference, Jun. 21-25, Amelia Island Plantation, Amelia Island, Florida, USA.
Guha et al., "Deep Learning Based High-Resolution Reconstruction of Trabecular Bone Microstructures from Low-Resolution CT Scans using GAN-Circle", Proc SPIE Int Soc Opt Eng..Web. Feb. 2020; Proc SPIE Int Soc Opt Eng.; pp. 1-21, retrieved on Nov. 21, 2022, retrieved from the internet: https://www.ncbi.nlm.nih.gov/pmc/articles/PMC7085412/pdf/nihms-1571617.pdf.
Bredbenner, et al., "Fracture Risk Predictions based on Statistical Shape and Density Modeling of the Proximal Femur", J. Bone Miner Res., 2014, HHS Public Access, Author Manuscript; available in PMC 2015., pp. 1-31.
Osteoporosis: assessing the risk of fragility fracture (CG146), Nice Clinical guideline, 2012, UK, last updated 2017, pp. 1-14.
Ferrari, et al., "Unmet Needs and Current and Future Approaches for Osteoporotic Patients at High Risk of Hip Fracture", Arch Osteoporos, 2016, 11:37, Springer, pp. 1-12.
Gross, et al., "Morphology-Elasticity Relationships using Decreasing Fabric Information of Human Trabecular Bone from Three Major Anatomical Locations", Biomech Model Mechanobiol (2013) 12: 793-800, Springer, 2012, Heidelberg.
Hernandez, et al., "Understanding Bone Strength is not Enough", HHS Public Access, Author Manuscript, J. Bone Miner Res. 2017, 32(6): 1157-1162, New York.

(56) References Cited

OTHER PUBLICATIONS

Homminga, et al., "Cancellous Bone Mechanical Properties From Normals and Patients With Hip Fractures Differ on the Structure Level, Not on the Bone Hard Tissue Level", Bone vol. 30, No. 5, 2002: 759-764, Elsevier, The Netherlands.
Kanis, et al., "Ten Year Probabilities of Osteoporotic Fractures According to BMD and Diagnostic Thresholds", Osteoporosis International (2001), vol. 12, United Kingdom/The Netherlandds, pp. 989-995.
Mccreadie, et al., "Biomechanics of Fracture: Is Bone Mineral Density Sufficient to Assess Risk?", Journal of Bone and Mineral Research, vol. 15, No. 12, 2000, Orthopedic Research Laboratories, University of Michigan, Ann Arbor, Michigan, USA, pp. 2305-2308.
Mikolajewicz, et al., "HR-pQCT Measures of Bone Microarchitecture Predict Fracture: Systematic Review and Meta-Analysis", Journal of Bone and Mineral Research, vol. 35, No. 3, 2020, pp. 446-459.
Pahr, et al., "A comparison of enhanced continuum FE with micro FE models of human vertebral bodies", Journal of Biomechanics, vol. 42, 2009, Austria, pp. 455-462.
World Population Prospects: The 2008 Revision vol. II Sex and Age Distribution of the World Population, United Nations, Department of Economic and Social Affairs, Population Division, New York, 2009, pp. 1-965.
International Search Report and Written Opinion from corresponding PCT Appln. No. PCT/US22/76988 dated Dec. 16, 2022. 10 pages.
Final Office Action from corresponding U.S. Appl. No. 12/709,309, dated Jun. 1, 2012. 8 pages.
Office Action from corresponding U.S. Appl. No. 12/709,309, dated Jan. 17, 2012. 17 pages.
Chun et al., "Patchwise bone microstructure reconstruction", The 2021 World Congress on Advances in Structural Engineering and Mechanics, 2021, S. Korea, pp. 1-5.
Xie et al., "Super-Resolution reconstruction of Bone Micro-Structure Micro-CT Image based on Auto-Encoder Structure", IEEE International Conference on Robotics and Biomimetics, 2019, China, pp. 1568-1575.
Extended European Search Report from related EP Appln. No. 22873908.2, dated Jul. 15, 2025.

* cited by examiner

BONE FRACTURE RISK PREDICTION USING LOW-RESOLUTION CLINICAL COMPUTED TOMOGRAPHY (CT) SCANS

FIELD

The following disclosure relates generally to bone fracture risk analysis, and more particularly, to bone fracture risk prediction using low-resolution clinical CT scans, for example, CT scans having a resolution in a range of 250 to 1000 microns.

BACKGROUND

Osteoporotic fractures commonly occur in the hip and vertebrae, and represent seventeen billion dollars of burden in healthcare-related costs. Beyond the economic burden, osteoporotic fractures are a significant cause of morbidity and mortality for those over 60 years of age. In fact, hip fractures are fatal in 20% of cases within this community, and for those who survive, 50% will be permanently disabled. Thus, only 30% of affected patients fully recover. It is estimated that 40%-46% of women over 50, and 13%-22% of men over 50 will suffer an osteoporosis-related fractures. With the number of persons over 60 projected to nearly triple by 2050, a significant increase in at-risk populations for fracture is imminent.

Thus, the need is immediate to identify those at greatest risk of bone fracture and to develop more effective treatment and prevention strategies for bone fragility.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
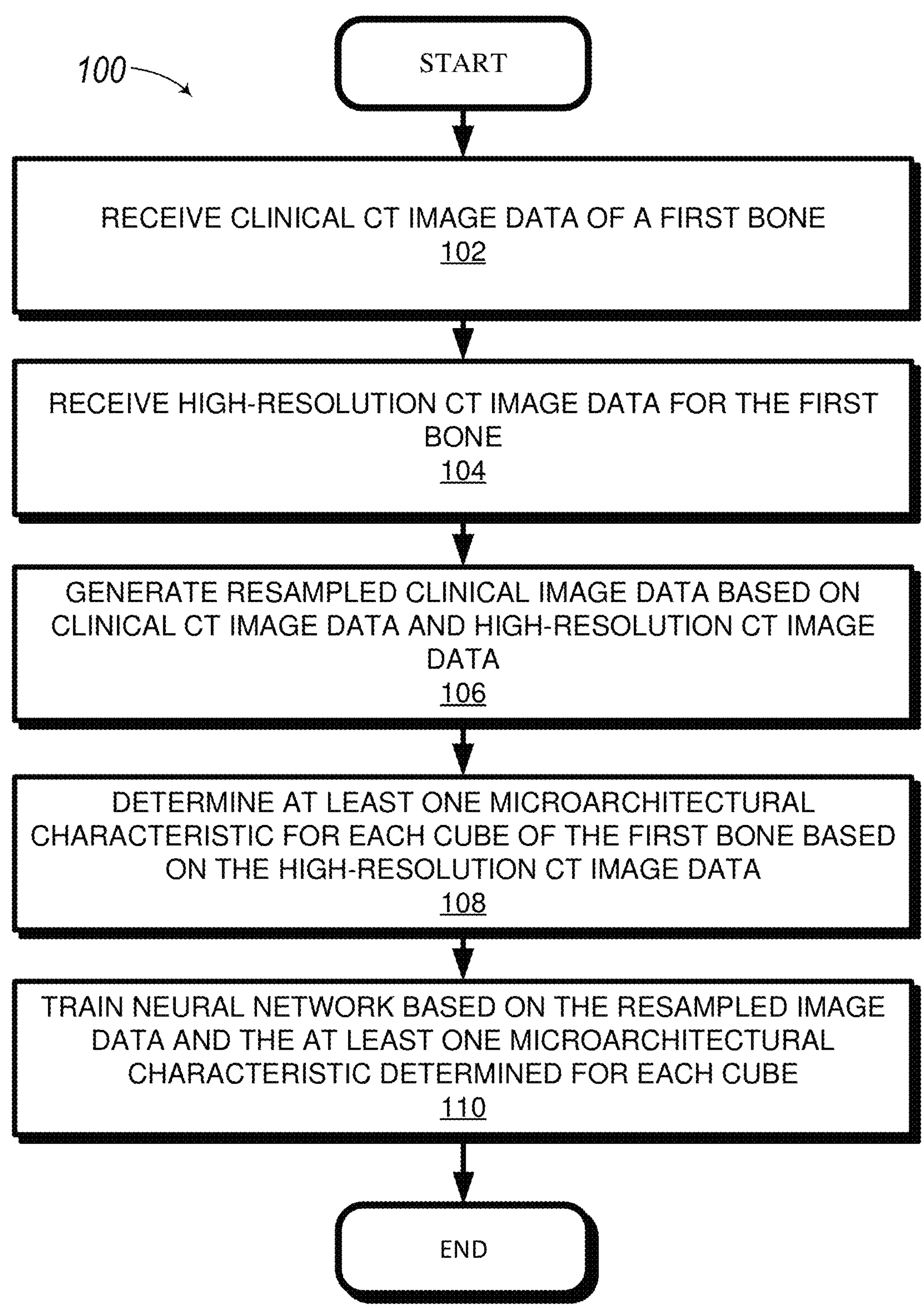
FIG. 1 shows an example process/method consistent with aspects of the present disclosure.

Over the past two decades, significant progress has been made in our understanding of bone fragility and fracture. However, over the same period, little progress has been made clinically to assess fracture risk and provide timely intervention. This has been in part due to the narrow breadth of accessible biomarkers that indicate fracture risk. In fact, the only readily agreed upon clinical measure of fracture risk is bone mineral density (BMD).

BMD can be determined using low-resolution image data from equipment, e.g., CT sensors/imagers, that is readily available within clinical environments such as doctor's offices and hospitals. Such equipment may also be referred to herein as clinical imaging devices, and likewise, the image data output from these devices may also be referred to herein as CT clinical imaging data or simply clinical imaging data.

Clinical imaging devices tend to provide relatively low-resolution image data based on associated sensors having a resolution of about 500 microns. In addition, the resolution of clinical imaging devices is generally non-isotropic, which is to say the resolution varies in the transaxial plane (X-Y plane) relative to the longitudinal direction (Z direction). Unfortunately, BMD historically has only a 30-50% success rate in predicting fractures.

Bone is a complex structure with an intricate microstructural organization. While BMD only gives a rough estimate of the amount of mineralized bone per unit volume, the characterization of a bone's microstructure (an indicator of bone quality) provides a relatively more complete picture of a bone's structural fortitude. As such, computational models based on bone's microstructural organization have demonstrated efficacy and relatively high accuracy, especially compared to models based on low-resolution clinical image data (BMD-based models).

Unfortunately, this microstructural information has not been available clinically due to the equipment and radiation exposure re-quired to generate such high-resolution image data. As such, high-fidelity computational models with microstructural information have been reserved for animal and cadaver studies.

Within the past few years, high-resolution peripheral quantitative computed tomography (HR-pQCT) has emerged as a promising technology to clinically assess bone microstructure and has been shown to reveal predictive information of bone fracture risk. However, HR-pQCT is limited in its use. Only small volumes of bone can be scanned at a time, and only specific locations of the bone can be scanned (e.g., distal tibia, distal radius, and so on). A large portion of information describing bone's structural integrity remains unreachable with this technology. Whole-bone descriptions of structure have been found to be significantly more predictive than isolated measures of bone structure.

There exists a need for determining bone strength and fracture risk using microstructural information derived without the necessity of high-resolution CT imaging such as through HR-pQCT and microCT image sensors.

Thus, in accordance with an aspect of the present disclosure, a method of deriving microstructural measures from clinical CT image data is disclosed. Preferably, the microstructural measures are derived from whole-bone image data.

In more detail, a method for up-sampling/up-scaling clinical CT image data is disclosed that utilizes a three-dimensional (3D) convolutional neural network (CNN) to produce predicted high-resolution CT image data and/or predicted microarchitectural characteristics. The high-resolution CT image data preferably has an image quality similar to microCT-quality, e.g., 60 microns or less, and more preferably 60 microns of isotropic resolution or less. Isotropic resolution refers to the spatial resolution in the transaxial plane (X-Y plane) being equal to the longitudinal direction (Z direction).

Aspects of the present disclosure have recognized that a neural network can be trained via a relatively constrained dataset that includes CT image data for a particular/target bone across a number of individuals. For example, aspects of the present disclosure have identified that a data set with CT image data for as few as four individuals can be used to accurately predict (within an error range of 5 to 10%) microarchitecture characteristics based on clinical CT image data that was not used to train the neural network, e.g., novel image data. Additional accuracy can be achieved through using larger data sets for training, e.g., data sets having the CT image data of a bone across hundreds or more individuals.

A neural network consistent with the present disclosure can achieve this relatively low error rate using a constrained data set through a matching/registration process that utilizes clinical CT image data paired/matched with high-resolution CT image data for an identical bone. The neural network can then utilize ground-truth microarchitectural characteristics from the high-resolution CT image data as a loss function, the result of which demonstrates the distance/loss between the predicted microarchitectural characteristics derived from the clinical CT image data relative to the ground-truth microarchitectural characteristics derived from the high-resolution CT image data. Training preferably includes N number of iterations until the resulting measured loss (or error rate) reaches a predetermined error rate, e.g., preferably in a range of 5 to 10%, and more preferably 5% or less. Iterations in the context of training a neural network refers to one complete pass forward and backward through the neural network to update weights/connections within the hidden layer(s). The particular number of training iterations to achieve the predetermined error rate varies depending on factors such as the size of the training data set, the number of target microarchitectural characteristics, and so on.

Existing approaches to training of machine learning models generally seek to avoid such relatively low loss/error rates when utilizing relatively constrained data sets as overfitting can occur. Overfitting can reduce a model's ability to generalize (e.g., to infer/predict an output from a novel/new input value outside of the training set), and can cause secondary patterns within data to be "learned" including those patterns caused by noise.

A machine learning model/neural network consistent with the present disclosure minimizes or otherwise reduces such draw backs by ensuring that the CT image data used for training is effectively noise-free through registration processes as disclosed herein, and by segmentation of CT image data, e.g., through applying a template mesh that allows for a cube-based approach to partitioning/delineating voxels, that ensures that each portion/cube/volume of CT image data corresponds to the same/identical position of a bone across individuals. Accordingly, the neural network can produce accurate predictions on a per-cube/volume basis through the anatomical constraints/characteristics associated with that bone position across all individuals represented within the training data.

Simply stated, the anatomical correspondence of each cube/volume of CT image data allows for predictions to be focused on a relatively small portion of clinical CT image data that can be matched/registered identically between CT image data of the same bone (from different individuals). Stated by of way of illustration, each cube/volume of the clinical CT image data has a relatively small portion of signal relative to noise due to the relatively low resolution of the clinical CT image sensors. The present disclosure has identified that the per-cube/volume processing approach of the present disclosure allows the neural network to "infer" the correct/actual microstructure for each cube/volume of CT image data using this relatively small amount of signal from clinical CT images, which was previously believed to be unusable for microarchitectural analysis.

Thus, aspects of the present disclosure allow for clinical CT image data to be utilized for purposes of microarchitectural analysis and fracture risk assessment. A system consistent with the present disclosure could be utilized in a clinical setting, such as a doctor's office, and operate based on CT image data from local clinical CT image sensors and without the necessity of high-resolution CT image sensors. This disclosure represents a significant advance in providing accurate fracture analysis for individuals/patients without the cost, complexity, and dangers of radiation exposure of high-resolution CT image scanners.

The term instantiated in the context of loading objects/representations into computer memory, such as a 3D CNN, refers to a representation of the object being loaded/created into memory by a controller/processor through execution of a plurality of machine readable instructions. Such machine readable instructions can be used to implement various processes and features disclosed herein and may be generated via a high-level computer programming language (e.g., C++, Python) that can be interpreted/compiled into plurality of computer-readable instructions and stored in a non-transitory manner (e.g., in physical memory such as RAM).

FIG. 1 shows one example process 100 for up-scaling a clinical CT image consistent with the present disclosure. The example process 100 is preferably executed by a controller/processor, such as a controller/processor (not shown) of a computer. The example process can be implemented via a system, and preferably, a system configured to determine bone fracture risk for a patient. Preferably, the process 100 is executed by a controller/processor based on execution of a plurality of machine-readable instructions stored in a memory (not shown). Note, the process 100 can include more or fewer acts, and acts are not necessarily required to be performed in the particular order shown.

In act 102, the controller receives clinical CT image data of a first bone. The first bone can be of a first bone type such as a human femur. Aspects of the present disclosure are equally applicable to non-human bones, such as bones from livestock and other animals. The clinical CT image data received in act 102 may also be referred to herein as reference clinical CT image data.

The clinical CT image data preferably comprises image data output from a clinical CT image sensor. The format of the clinical CT image data preferably comprises Digital Imaging and Communications in Medicine (DICOM) image files, although other standard and/or proprietary formats are within the scope of this disclosure.

The clinical CT image data preferably has a resolution of, for example, 250×350×350 (X/Y/Z) microns, although other resolutions are within the scope of this disclosure.

The clinical CT image data preferably includes a plurality of voxels. The clinical CT image data preferably describes the physical relationship between voxels such that the position of each voxel of a given bone/object, or set of bone/objects, is identifiable within three-dimensional space. Each voxel can be represented by, for instance, an integer value that denotes a density value or effective atomic number (Zeff) as detected by a CT scanner. Generally, a higher value for a voxel indicates relatively dense material while a lower value indicates a relatively less dense material such as air and bodily tissue. However, this disclosure is not necessarily bound to a particular numerical representation of voxels and the provided examples are provided by way of illustration and not limitation.

The clinical CT image data preferably includes voxels representing at least a portion of the first bone, and more preferably, voxels representing an entirety of the first bone.

Figure 2:
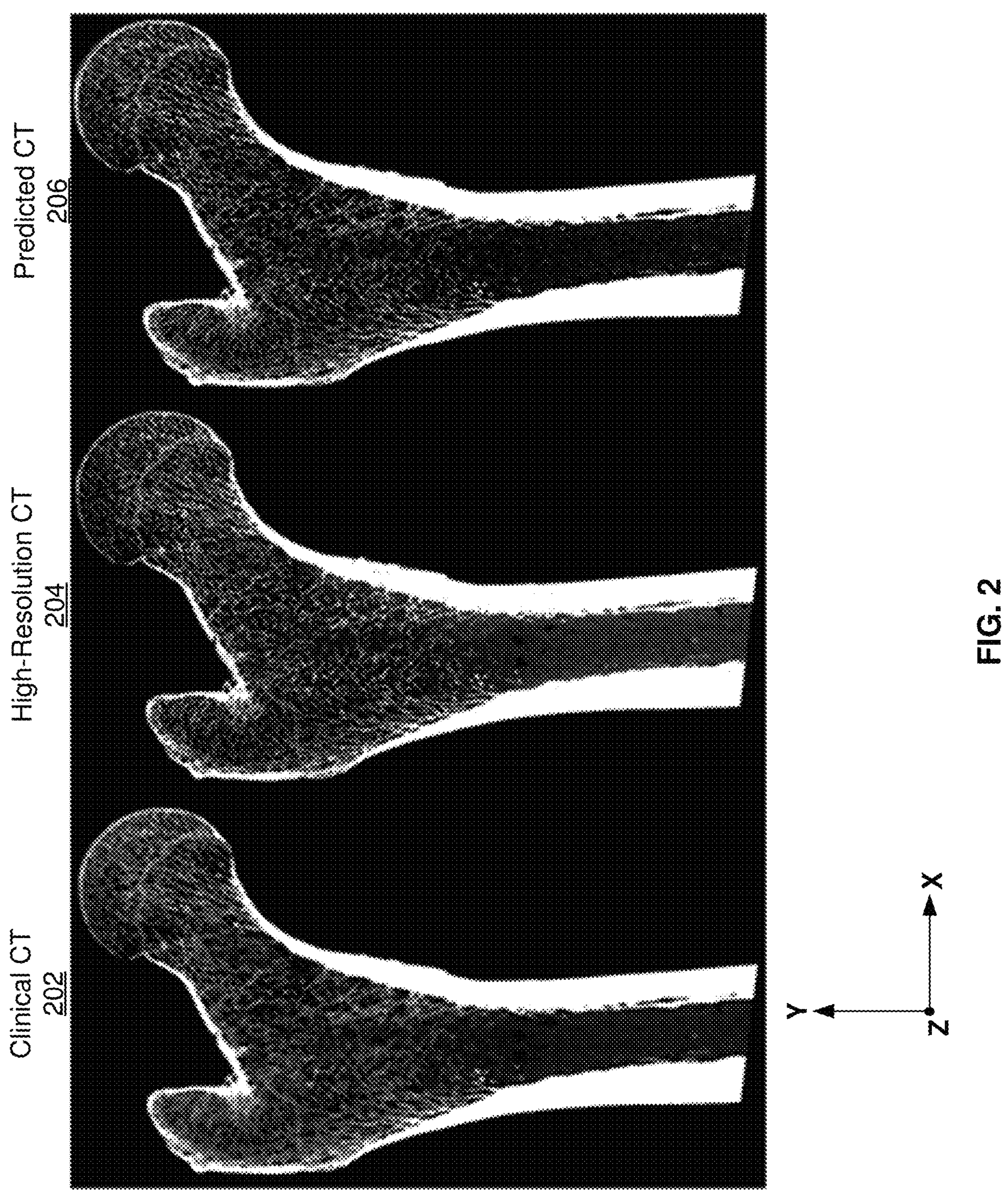
FIG. 2 shows a plurality of CT images of a bone consistent with aspects of the present disclosure.

In either case, the voxels representing the first bone preferably provide a 3D representation of the first bone. This 3D representation may be visualized in two dimensions such as shown in FIG. 2. In this example, each two-dimensional image is a cross-sectional view or "slice" of the transaxial plane (X/Y) of the first bone at a given Z axis position. Each slice preferably includes an M×N array of voxels as established by the resolution of the CT image sensor.

The particular number of "slices" in this example may be based on the resolution of the clinical CT image data, and more particularly, the resolution of the clinical CT image data along the Z axis (which may also be referred to herein as an out-of-plane resolution). Each "slice" of clinical CT image data may be visually represented via a two-dimensional image such as is shown in FIG. 2. Note, "slices" are not necessarily limited in this regard and slices may also be taken transverse to the transaxial plane such that each slice is a cross-sectional view taken along the Z axis, for example.

Note, the clinical CT image data may not necessarily include a plurality of slices (e.g., the CT image data can have an out-of-plane depth equal to one voxel), and can include as few as a single slice. However, the clinical CT image data preferably includes an out-of-plane depth greater than one voxel to provide increased resolution for purposes of microarchitecture analysis as discussed in further detail below.

Preferably, the clinical CT image data shows the first bone in a first orientation that includes a longitudinal axis of the first bone extending substantially transverse relative to the Z-axis. Stated differently, the clinical CT image data preferably includes the first bone extending length-wise within the transaxial plane. This orientation may also be referred to as a top-to-bottom orientation. However, this disclosure is not limited in this regard and the first bone may also be in other orientations such as parallel with the Z-axis.

Note, the clinical CT image data may also include representations of two or more bones and/or other matter such as human tissue. In some cases, manual and/or automatic filtering (e.g., algorithmic filtering) may be utilized to remove/zero out voxels associated with objects other than a particular target bone/bone of interest.

In act 104, the controller receives high-resolution CT image data for the first bone, with the first bone represented within the high-resolution CT image data being preferably the identical/same bone represented within the clinical CT image data received in act 102. Stated differently, the clinical CT image data and the high-resolution CT image data are preferably output by respective CT scanners that imaged the same bone (first bone) for the same individual.

Preferably, the high-resolution CT image data is output from a CT scanner such as a microCT scanner. The high-resolution CT image data may also be referred to herein as reference high-resolution CT image data, reference high-resolution images, or as reference microCT images, or as simply microCT images. Preferably, the high-resolution CT image data has a resolution that is different than the resolution of the clinical CT image data received in act 102. More preferably, the high-resolution CT image data has a resolution that is greater, e.g., an isotropic resolution of 60 microns or less, than the clinical CT image data, e.g., which can have a resolution of about 350±150 microns or more. In one example, the high-resolution CT image data has a resolution in a range of 40 to 100 micron isotropic resolution.

In scenarios where only a portion of the first bone is represented in the clinical CT image data received in act 102, the high-resolution CT image data preferably includes the same bone portion represented therein.

Preferably, the high-resolution CT image data includes a number of "slices" that are based on the particular resolution along the Z axis. As shown in FIG. 2, an example of the high-resolution CT image data is shown in the form of a microCT two-dimensional image. This microCT two-dimensional image can be based on the high-resolution image data having at least one "slice," and more preferably, a plurality of such slices that allow each cross-sectional of the first bone, and more particularly the transaxial plane at each Z axis interval, to be separately visualized and/or analyzed.

Preferably, the high-resolution CT image data received in act 104 is spatially registered/aligned with the clinical CT image data. The term spatially registered/aligned means that that each "slice" of the bone within the high-resolution CT image data is associated with one or more corresponding slices of the clinical CT image data.

Consider one example for illustration purposes with reference to FIG. 2. In this example, consider that the two-dimensional clinical CT image data 202 of the first bone is representative of a slice of the first bone at a Z depth equal to N, with N corresponding to an effective Z position of 10 mm into the bone. Spatial registration in this example includes aligning the slice of the bone with the corresponding slice(s) within the high-resolution CT image data 204 along the X and Y axis.

The bone structure shown in the transaxial plane of the clinical CT image of FIG. 2 is therefore preferably aligned/registered to the "slices" of the high-resolution CT image data that represents the same bone structure. Given that the resolution of the clinical CT image data in this example is relatively coarse, e.g., 250 microns, the high-resolution CT image data will have about 4.17 corresponding slices for every corresponding slice of the clinical CT image based on a Z resolution of 60 microns (250/60=4.17). Each of the slices of the clinical CT image data is preferably registered/aligned in this fashion.

Thus, if the high-resolution CT image data is visualized in 3D space next to the aligned/registered clinical CT image data, e.g., using a three-dimensional computer modeling application, the clinical CT image representation of the first bone could be shifted/displaced along the Y axis to cause the high-resolution CT image representation of the bone to be coincident, e.g., occupy the same/identical dimensional space/volume as the clinical CT image representation. Simply stated, the bone structure represented by the high-resolution CT image data is preferably aligned/registered with the bone structure of the clinical CT image data to the extent that the two bone structures could occupy substantially an identical volume in 3D space and have a 1:1 correspondence of bone structure features/components such that to an observer only a single bone appears to be visualized.

This registration/alignment of the high-resolution CT image data can occur during act 104, or can occur prior to act 104 such that the received high-resolution CT image data is pre-aligned/pre-registered.

Preferably, the high-resolution CT image data and the clinical CT image data are stored in a memory as a registered/aligned set.

More preferably, a plurality of such registered/aligned sets is stored in the memory and associated with a first target bone type. Each registered/aligned set stored in the memory preferably includes a clinical CT image of a bone of a first individual that is of the target bone type along with high-resolution CT image data of the bone of the first individual. Preferably, a plurality of such registered/aligned sets for the first target bone type are stored in the memory. Each of the registered/aligned sets preferably includes an identical/same orientation for the bone represented therein, e.g., bones are oriented in three dimensional space in a same/common orientation, although this disclosure is not limited in this regard. The memory can include a total number of registered/aligned sets for a first type of bone, e.g., a femur, in a range of 1 to 100, 100 to 1000, or 1000 to 10000 sets depending on a desired configuration. Each set stored in the memory preferably corresponds to a different individual such that a wide-range of different femur bones are represented therein.

Note, the memory can further include registered/aligned set(s) for a second target bone type, the second target bone type being different than the first. For instance, the second target bone type can include a humerus bone, and the memory can include one or a plurality of registered/aligned sets for the second target bone type.

In act 106, the controller generates resampled clinical image data based on the clinical CT image data and the high-resolution CT image data. The controller preferably generates the resampled clinical image data by, for instance, linear or cubic interpolation. The resampling preferably results in the resampled CT image data having each voxel correspond in a 1:1 fashion with a respective/aligned voxel of the high-resolution CT image data. The introduced/added voxels within the resampled CT image data are preferably assigned the same value as their originating voxel within the resampled clinical image data. The controller preferably generates the resampled clinical image data with an isotropic voxel size equal to the identified high-resolution image, e.g., 60 microns.

In act 108, the controller determines at least one microarchitectural characteristic for each cube of the first bone based on the high-resolution image data. A cube as used herein refers to a plurality of voxels with a predetermined size/volume (M×N×Y), such as a 5×5×5 mm or cube of image data. Each cube is preferably a distinct set of voxels. A template mesh can be utilized to establish the particular number of cubes for the first bone and to associate each voxel(s) with a respective cube. Also note that this disclosure is not necessarily limited to cubes for purposes of associating voxels and aspects of the present disclosure can utilize other regular or irregular geometric shapes. One example of a geometric shape that can be utilized is a tetrahedron.

Figure 3:
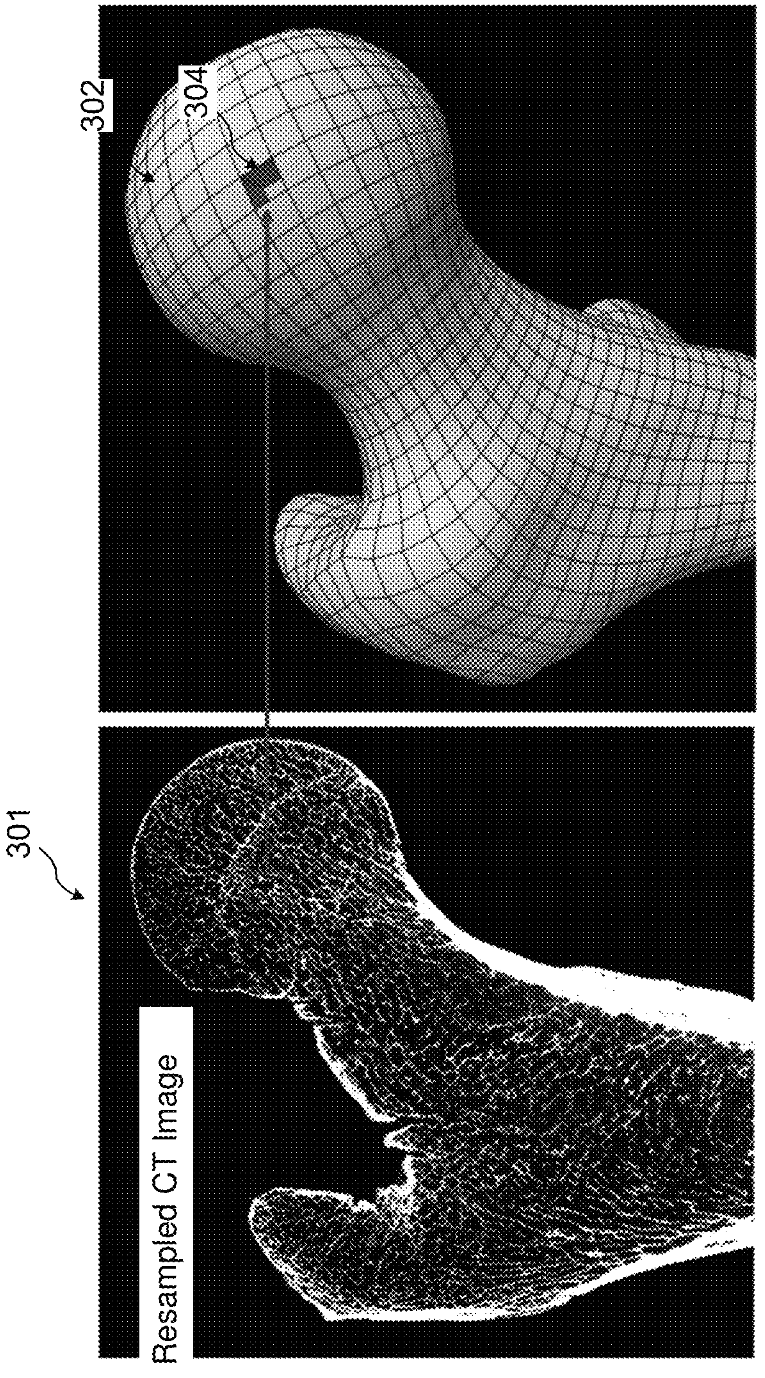
FIG. 3 shows an example of a template mesh applied to a bone represented within resampled CT image data consistent with aspects of the present disclosure.

FIG. 3 shows one example of a template mesh 302 generated for the bone structure shown in the resampled CT image data 301. As shown, the template mesh 302 includes a plurality of cubes based on a grid that is warped/transformed about the contours of the bone structure. Preferably, the template mesh 302 can be warped/transformed in a manner that ensures that the cube topology/configuration is consistent for a given bone type. For instance, the template mesh 302 can be configured for femur bones and can produce a grid/topology that is consistent across a range of individuals such that each imaged femur has essentially an identical cube assignment for each structure feature. Each imaged femur bone preferably includes the cube generally shown at 304 at the same anterior position/location of the head of the femur.

One example template mesh and methods of generating the same is described in U.S. Pat. No. 8,725,231 (hereinafter the '231 patent) filed on Feb. 9, 2010 and entitled "Fracture Risk Assessment," which is fully incorporated herein by reference.

Macroarchitectural characteristics for a bone includes the nodal coordinates of the surface vertices of the template mesh when morphed to the target bone. Such macroarchitectural characteristics can describe the collective effect of the macroarchitectural characteristics on the structure of the bone, such as the overall shape of the bone.

The at least one microarchitectural characteristic may also be referred to herein as a microarchitectural measure. The microarchitectural measures can be calculated/determined using high-resolution CT image data consistent with aspects of the present disclosure in combination with existing methods.

In one example, microarchitecture measures are calculated based on spatial measurements, such as the thickness of the trabeculae or the spacing between each trabecula within a target cube. Alternatively, or in addition, the microarchitecture measures can include fabric tensor-based variables using approaches such as the Mean Intercept Length method, Star Volume Distribution method, and/or Star Length Distribution method.

In one example, the controller determines the at least one microarchitectural characteristic for a target cube via a grid with a predetermined grid spacing. The predetermined grid spacing can be 3×3×3 mm voxel spacing, for example, or other sizes such as 5×5×5 mm. In this example, the controller can utilize the grid to determine at least one microarchitectural characteristics/measures using the high-resolution CT image data such as fabric tensor and bone volume fraction to define an orthotropic elasticity tensor, average trabecular spacing, and/or average trabecular thickness. Additional microarchitectural characteristics can include, for instance, trabecular number, cortical porosity, cortical thickness.

Accordingly, each cube within the high-resolution CT image data is associated with at least one microarchitectural measure. The at least one microarchitectural measure for each cube is preferably stored in a memory, e.g., using an array or other suitable approach such as a lookup table. The at least one microarchitectural measure may also be referred to herein as a ground-truth measure and used during training of a neural network as discussed below. Preferably, the ground-truth measures are derived from applying a template mesh to the bone represented in the high-resolution CT image data. The template mesh can then be used to define/output a plurality of cubes. Preferably, the template mesh is the same template mesh that is applied to the resampled CT image data as discussed above. Each cube of the plurality of cubes being preferably a M×N×Y cube of voxels that collectively define physical structure of the bone in three-dimensional space.

In act 110, the controller trains a neural network based on the resampled clinical image data and the high-resolution CT image data. The neural network is preferably implemented as a 3D CNN.

The controller preferably trains the neural network by instantiating/loading the same within a memory. In one example, the neural network takes the resampled clinical CT image data as input and is trained with the high-resolution image data as output.

In one example, the neural network is configured to associate each cube of the high-resolution image data with at least one corresponding microarchitectural characteristic, e.g., such as determined from the high-resolution CT image data in act 108.

During training, the neural network preferably processes each cube of the resampled image data sequentially, e.g., one at a time. The boundary/size of the cube and the location of the cube is predetermined using a priori information, e.g., based on the template mesh as discussed above. The neural network preferably includes an input layer to receive computed tomography (CT) image data of a bone, at least one convolution layer coupled to the input layer to predict at least one microarchitectural characteristic based on the received CT image data, and an output layer coupled to the at least one convolution layer to output the at least one predicted microarchitectural characteristic and/or output predicted CT image data based on the at least one predicted microarchitectural characteristic. The neural network may then pass the cube through one or more hidden layers including at least one convolution layer that can determine at least one predicted microarchitectural characteristic for the cube and/or the predicted voxel values for the cube that achieves the at least one predicted microarchitectural characteristic.

Thus, in one example, the at least one convolution layer can adjust the target cube with voxel values that represent the bone structure that is predicted to be present. After each cube is processed in this fashion, the neural network may then output predicted high-resolution CT image data based on the resampled clinical image data input into the neural network. Alternatively, or in addition, the neural network can be configured to output at least one predicted microarchitectural characteristic for each cube.

In one preferred example, training of the neural network includes inputting a cube of the resampled CT image data and comparing at least one predicted microarchitectural characteristic determined for the cube to a corresponding ground-truth. For example, and as discussed above, at least one microarchitectural characteristic can be determined for each cube of the high-resolution CT image data and utilized as a ground-truth (or ground-truth microarchitectural characteristic). Therefore, a cube of image data from the resampled CT image data can be passed into the network along with at least one corresponding ground-truth microarchitectural characteristic. The neural network may then compare the at least one predicted microarchitectural characteristic to the at least one corresponding ground-truth microarchitectural characteristic to determine a loss.

The neural network may then update the weights of various connections within constituent layers (e.g., within the at least one convolutional layer) until the loss between predicted and ground-truth is equal to or less than a predetermined error rate. Preferably, the predetermined error rate is ten percent or less, and more preferably equal to or less than five percent. Preferably, the neural network is trained in this manner such that each cube of the resampled CT image data input into the neural network has a resulting error rate equal to or less than the predetermined error rate.

The aforementioned ground-truth microarchitectural characteristics can serve as loss functions to optimize the neural network and arrive at physiologically consistent and accurate predictions for the composition of each cube within the resampled CT image data.

The output of the neural network may therefore be a finite element model of a bone that can include high-resolution predicted CT image data (see predicted CT image data 206 in FIG. 2), and/or at least one predicted microarchitectural characteristic per cube.

FIG. 2 shows a plurality of CT images including an example clinical CT image 202, a high-resolution CT image 204 that is registered/aligned with the clinical CT image 202, and a predicted CT image 206 output by a neural network consistent with the present disclosure. As shown, the neural network is preferably configured to output the predicted CT image 206 that is substantially identical to the high-resolution CT scan when visualized such as shown in FIG. 2, and importantly, with the at least one predicted microarchitectural characteristic having an error rate of preferably less than or equal to 10%, and more preferably less than or equal to 5%. The present disclosure has identified an error rate of 5% or less demonstrates that the neural network can accurately predict structural characteristics of a bone from low-resolution CT clinical image data.

The neural network trained in act 110 may then be used to output highly-accurate predicted CT image data, see FIG. 2, and/or predicted microarchitectural characteristics on a per-cube basis for a bone using novel clinical CT image data, e.g., clinical CT image data not used during training. This advantageously allows for clinical CT image data to be utilized for preferably whole-bone fracture analysis, and in particular bone fracture analysis that operates on microarchitectural characteristics, which was previously impractical given the resolution of clinical CT images.

In one example, a neural network consistent with the present disclosure can be configured to output a finite element model of a target bone using clinical CT image data. The finite element model can include, for example, a mesh such as the template mesh shown in FIG. 3 and material/structural properties based on the predicted microarchitectural characteristics.

Alternatively, or in addition, a neutral network consistent with the present disclosure can be used to output an anatomically correspondent feature vector of a bone based on predicted microarchitectural characteristics, which may then be used to predict fracture risk.

Anatomically correspondent means that an entry in the feature vector corresponds to the same anatomical location for every bone passed through the neural network. In other words, an example would be, the very first entry in the feature vector can be the trabecular thickness at the femoral neck for each bone that passes through the neural network. Likewise, the last entry can be the trabecular spacing at the medial femoral condyle.

The following describes one example process for automatic generation of a subject-specific, microarchitectural-physics based computational model consistent with the present disclosure. This model may be used to calculate and output a value representative of the probability of a fracture given a fall event, and/or a measure of bone strength and resilience. As discussed further below, clinical CT image data can be used to (directly) predict fracture risk of an individual without the necessity of high-resolution CT scanners.

Assessing Fracture Risk with Feature Vectors Obtained from Model-Derived Microarchitectural Information Using fracture outcome data (e.g., data for individuals who have fractured and those that have not) and traits to compare among individuals, a machine learning algorithm consistent with the present disclosure can identify traits that statistically suggest predisposition of an individual to a bone fracture.

Accordingly, specific target traits can be input into a machine learning model/algorithm consistent with the present disclosure to assess whether the individual is statistically at-risk for fracture, even when such specific target traits were not utilized as input during the machine learning training process.

A method of automatically extracting comparable microarchitectural and macroarchitectural bone traits from individuals is disclosed herein and can use clinical CT images that are up-scaled and used to predict CT image data consistent with various aspects of the present disclosure.

The traits can serve as the input to a machine learning algorithm consistent with the present disclosure to differentiate fracture-prone from non-fracture-prone individuals.

Subsequently, those traits may be used to identify individuals whom are at-risk for bone fracture.

First, a template mesh of a bone can be determined/derived. One such example template mesh 302 is shown in FIG. 3.

Figure 4:
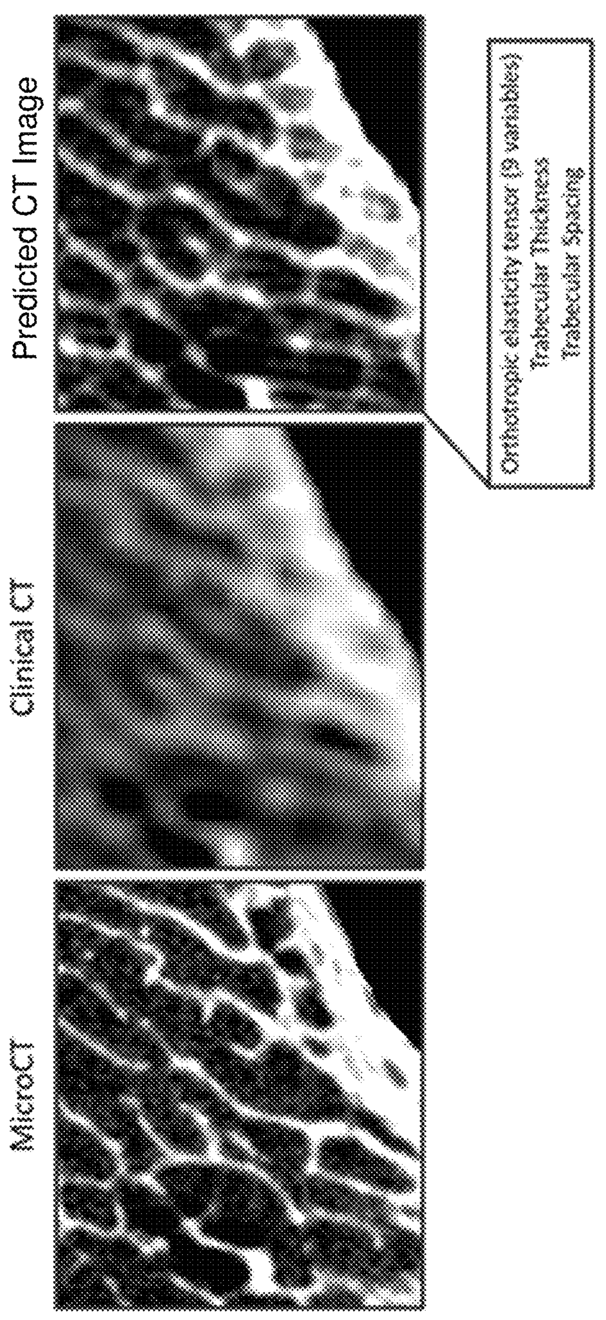
FIG. 4 shows one example spatial location of an original microCT/high-resolution CT image data (left), clinical CT image data of the same location (middle), and a resampled image data output (right).

Next, neural network (e.g., a 3D CNN) is preferably trained to determine, for example, an orthotropic elasticity tensor (e.g., comprised of the fabric tensor and bone volume fraction), average trabecular spacing, and average trabecular thickness (microarchitectural variables) from a clinical CT scan at each element location in the template mesh (See FIG. 4).

FIG. 4 shows one example spatial location of the original microCT/high-resolution image data (left), clinical CT image data of the same location (middle), and the predicted CT image data output (right). This predicted CT image data can be used to extract a plurality of measures/characteristics/variables that describe the microarchitecture of that location. Such variables can include, for instance, a N×N matrix through which a plurality of variables for the orthotropic elasticity tensor can be derived. For example, a 3×3 matrix can be used for the orthotropic elasticity tensor to derive a total of 9 variables (3×3=9). Additional variables can include, for instance, trabecular spacing and thickness. Note, orthotropic elasticity tensor can be derived from both the fabric tensor and bone volume fraction, which can represent how the bone is oriented and the amount of bone material present.

In this example, the neural network can be trained as discussed above with regard to FIG. 1 and thus be trained with the accompanying microarchitectural measurements derived from the high-resolution CT image data, e.g., the ground-truth microarchitectural measurements.

The neural network can map the microarchitectural measures/variables to each element in the associated template mesh. Thus, anatomical correspondence can be maintained between elements for each individual analyzed. Element refers to a discrete "piece" of a finite element model such as a cube or tetrahedron of the model, for example. Preferably, a finite element model comprises a plurality of cubes or tetrahedrons.

In addition to the microarchitectural measures/variables, the neural network can be trained to determine the spatial location (e.g., macroarchitectural variables) of each surface node of the template mesh when morphed to a particular target bone.

Both the microarchitectural and macroarchitectural variables can be flattened into a feature vector, that may then be reduced in dimension via linear and/or non-linear techniques, such as principal component analysis or uniform manifold approximation and projection. One example of this flattening is also discussed in the '231 patent.

This reduced set of variables and their associated weights can serve as the input to a machine learning algorithm to determine fracture risk, and output a value that represents the same.

To summarize, a neural network consistent with the present disclosure can be trained to use clinical CT image data as input and output a feature vector combining anatomically correspondent micro and/or macroarchitectural measures derived from high-resolution CT image data (e.g., non-clinical CT image data such as MicroCT image data). This feature vector may be used to determine fracture risk.

From the foregoing it will be appreciated that, although specific examples have been described herein for purposes of illustration, various modifications may be made without deviating from the spirit and scope of the disclosure described herein. Accordingly, the disclosure is not limited except as by corresponding claims and the elements recited by those claims. In addition, while certain aspects of the disclosure may be presented in certain claim forms at certain times, the inventors contemplate the various aspects of the disclosure in any available claim form. For example, while only some aspects of the disclosure may be recited as being embodied in a computer-readable medium at particular times, other aspects may likewise be so embodied.

What is claimed is:

1. A system comprising:

a controller configured to:

determine a template mesh of a bone;

instantiate a neural network in a memory, the neural network having an input layer to receive computed tomography (CT) image data of the bone, at least one convolution layer coupled to the input layer to predict at least one microarchitectural characteristic and at least one macroarchitectural characteristic for each element location in the template mesh based on the received CT image data, and an output layer coupled to the at least one convolution layer to output the at least one predicted microarchitectural characteristic and/or output predicted CT image data based on the at least one predicted microarchitectural characteristic;

map the at least one microarchitectural characteristic to each element location in the template mesh to maintain anatomical correspondence between element locations for each individual analyzed;

receive reference clinical CT image data of a reference bone having a first bone type, the reference clinical CT image data having a first resolution;

receive reference high-resolution CT image data for the reference bone, the reference high-resolution CT image data having a second resolution, wherein the second resolution is greater than the first resolution;

store the reference clinical CT image data and the reference high-resolution CT image data in the memory as a registered/aligned set, wherein each slice of the bone within the reference high-resolution CT image data is associated with one or more corresponding slices of the clinical CT image data;

resample the reference clinical CT image based on the reference high-resolution CT image data such that the resampled reference clinical CT image data has a resolution equal to the second resolution;

determine the at least one microarchitectural characteristic based on the reference high-resolution CT image data, wherein the first resolution is in a range of 250 to 100 microns and the second resolution is 60 microns or less;

determine a spatial location of each surface node of the template mesh for a particular target bone from the reference high-resolution CT image data;

create a feature vector of the at least one microarchitectural characteristic and the at least one macroarchitectural characteristic;

reduce the feature vector in dimension using a linear and/or a non-linear techniques, wherein the linear and/or the non-linear techniques include at least one of principal component analysis or uniform manifold approximation and projection;

perform a fracture risk assessment based on an analysis of the reduced feature vector, and wherein:

the at least one macroarchitectural characteristic for the bone includes nodal coordinates of one or more surface vertices of the template mesh when morphed to a target bone;

the at least one predicted microarchitectural characteristic is calculated based on spatial measurements including at least one of a thickness of a trabeculae, a spacing between each trabecula within a target cube, or one or more fabric tensor-based variables, wherein the one or more fabric tensor-based variables using a Mean Intercept Length method, a Star Volume Distribution method, and/or a Star Length Distribution method; and the at least one microarchitectural characteristic for the target cube is determined via a grid with a predetermined grid spacing.

2. The system of claim 1, wherein the second resolution is an isotropic resolution of 60 microns or less.

3. The system of claim 1, wherein the controller is further configured to train the neural network based on inputting the resampled reference clinical CT data into the neural network and comparing an output of the neural network to the reference high-resolution CT image data.

4. The system of claim 3, wherein the controller is configured to train the neural network based on inputting the resampled reference clinical CT data into the neural network and comparing an output of the neural network to the reference high-resolution CT image data until the neural network has an error rate at or below a predetermined error rate.

5. The system of claim 4, wherein the predetermined error rate is five percent or less.

6. The system of claim 3, wherein the controller is further configured to apply the template mesh to the resampled reference clinical CT data to determine a first plurality of cubes, each cube of the first plurality of cubes being a M×N×Y cube of voxels that collectively define physical structure of the reference bone in three-dimensional space.

7. The system of claim 6, wherein the controller is further configured to train the neural network by inputting a first cube of the first plurality of cubes into the neural network to cause the neural network to output at least one predicted microarchitectural characteristic for the first cube.

8. The system of claim 6, wherein the controller is further configured to apply the template mesh to the reference high-resolution CT data to determine a second plurality of cubes, each cube of the second plurality of cubes being a M×N×Y cube of voxels that collectively define physical structure of the reference bone in three-dimensional space.

9. The system of claim 8, wherein the controller is further configured to train the neural network based on determining a ground-truth microarchitectural characteristic for a first cube of the second plurality of cubes, the first cube of the second plurality of cubes having anatomical correspondence with the first cube of the first plurality of cubes.

10. The system of claim 9, wherein the controller is further configured to train the neural network by comparing the at least one predicted microarchitectural characteristic for the first cube of the first plurality of cubes to the ground-truth microarchitectural characteristic and adjusting one or more connections within the at least one convolution layer based on a difference between the at least one predicted microarchitectural characteristic and the ground-truth microarchitectural characteristic.

11. The system of claim 9, wherein each of the second plurality of cubes is associated with at least one microarchitectural characteristic.

12. The system of claim 1, wherein:

a plurality of registered/aligned sets stored in the memory is associated with a first target bone type; and each of the registered/aligned sets includes the reference clinical CT image of the bone of a first individual that is of the first target bone type and the reference high-resolution CT image data of the bone of the first individual.

* * * * *